March 14, 1933.  J. W. MILNOR  1,901,318

MEANS FOR BALANCING CABLES EQUIPPED WITH A LONG SEA EARTH

Filed Sept. 11, 1931   2 Sheets-Sheet 1

Inventor
J. W. MILNOR
By his Attorney
Eugene C. Brown

March 14, 1933.   J. W. MILNOR   1,901,318
MEANS FOR BALANCING CABLES EQUIPPED WITH A LONG SEA EARTH
Filed Sept. 11, 1931   2 Sheets-Sheet 2

Inventor
J. W. MILNOR
By his Attorney
Eugene Leo Brown

Patented Mar. 14, 1933

1,901,318

UNITED STATES PATENT OFFICE

JOSEPH W. MILNOR, OF MAPLEWOOD, NEW JERSEY, ASSIGNOR TO THE WESTERN UNION TELEGRAPH COMPANY, OF NEW YORK, N. Y., A CORPORATION OF NEW YORK

MEANS FOR BALANCING CABLES EQUIPPED WITH A LONG SEA-EARTH

Application filed September 11, 1931. Serial No. 562,379.

This invention relates to submarine cable telegraph systems and more particularly to a method of and means for balancing long duplex submarine cables by an artificial line network, in systems where a long sea-earth conductor is employed for the purpose of neutralizing disturbances originating at the shore end of the cable.

The shore ends of ocean cables are often exposed to disturbing influences, such as power or traction systems and other communication circuits, and in addition the shore ends of the cable receive a share of disturbances from natural phenomena, such as static, lightning and magnetic storms. A customary method of protecting the receiving instruments from the effects of these disturbances is to extend the sea-earth connection for the current return path parallel to the main cable, preferably in the same sheath, to a point at sea having a depth of water at which the disturbing frequencies which the cable will pick up are so attenuated as not to affect the receiving instruments seriously. Then with both sides of the circuit similarly exposed, disturbances within the shore area will be substantially balanced out. This may require extending the earth conductor out to sea a distance of one hundred miles or more depending on the contour of the sea bed. In order to secure as close a resemblance as possible between the cable and the shorter earthing section, when looking from the terminal, the sea-earth conductor may be terminated at its outer end in an impedance or a resistance which has approximately the same value as the impedance of the remaining portion of the cable.

One of the objects of the invention is to provide an improved method of and means for balancing a cable equipped with a long sea-earth conductor inductively coupled to a section of the main cable.

Another object is to provide means for balancing the electrical characteristics of both the main cable and the long sea-earth cable and to inductively associate the balancing means to closely simulate the inductive relation of the main and sea-earth cables.

A further object is to provide, in such an arrangement, means to secure balanced capacities to ground for the main and sea-earth artificial lines.

Another object is to provide a method of and means for mutually coupling two balanced net works, to simulate the conditions in a twin core cable.

A still further object is to assemble the inductive elements of an artificial line or other electrical net work so as to neutralize the effects of extraneous disturbing magnetic fields.

Other objects and advantages will appear from the following description taken in connection with the accompanying drawings and appended claims.

In accordance with a preferred embodiment of my invention I connect the receiving instrument directly across the arms of a duplex bridge, in one of the impedance arms of which the main cable is included and in the other of which the main artificial line and sea-earth cable with its terminating impedance are included. A second or sea-earth artificial line is also included in the first impedance arm in series with the main cable to balance the electrical characteristics of the sea-earth cable. However the invention is not limited to this specific arrangement of main and sea-earth artificial lines for balancing the mutual impedance between the cores of the cable.

The main artificial line is composed of two parts, the first part corresponding to the portion of the head end of the main cable which is inductively related to the sea-earth cable, and the second part corresponding to the remainder of the main cable. The first part of the main artificial line comprises a number of elemental networks having characteristics equivalent to one conductor of an inductively coupled parallel pair and is mutually coupled to the corresponding network elements of the sea-earth artificial line in such manner that the mutual inductance of the main and sea-earth cables is closely simulated. It is, of course, impossible to isolate the artificial lines, and there is, therefore, a certain amount of direct capacity to ground from the lines which tends to introduce errors. If the two artificial lines have unequal capacities to ground these capacities are equalized by a shunt network to ground connected to the side of the artificial line having the highest impedance to ground.

Extraneous electrical interference occurring at the shore end of the cable is reduced by this arrangement to a negligible amount and a substantially perfect balance obtained over the range of frequencies employed in duplex telegraphy over submarine cables. In order to further reduce interference from stray magnetic fields which might generate interfering currents in the artificial line, the inductance coils are assembled in groups in such manner as to neutralize the effects of such magnetic fields.

In order that a full understanding of the invention may be had reference is made to the accompanying drawings in which.

Figure 3:
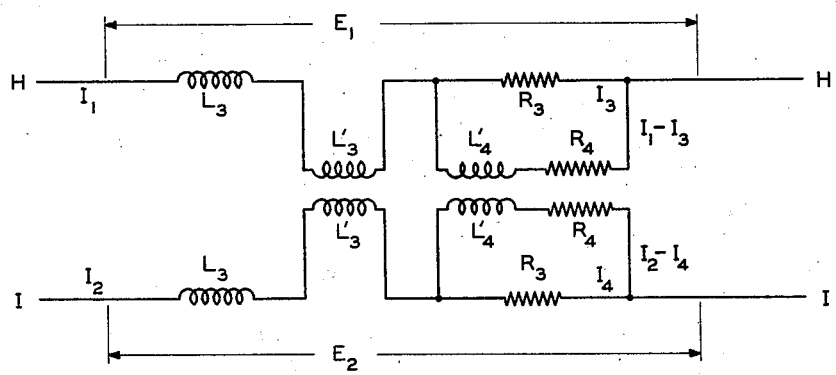
Figure 3 illustrates a form of mutually coupled network which may be employed to balance the mutually coupled portions of the main and sea-earth cables.
Figure 4:
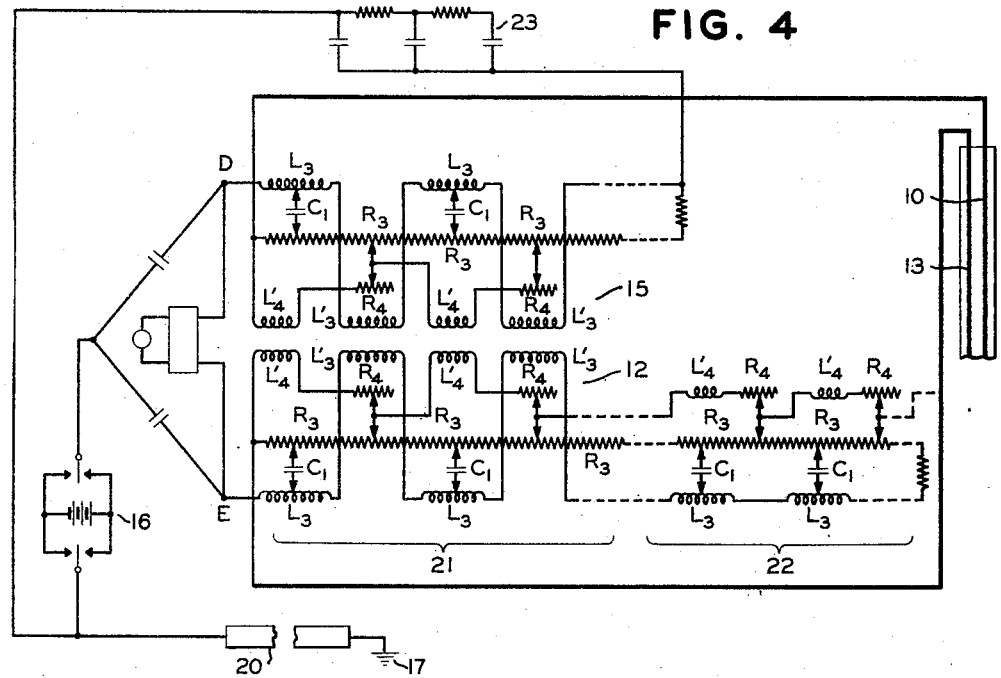
Figure 5:
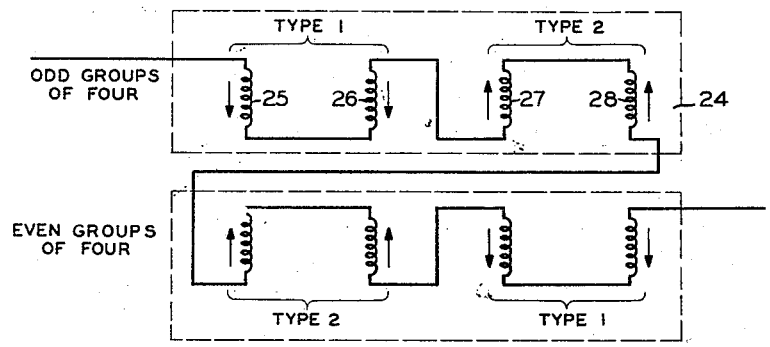

Figure 4 shows a complete artificial line embodying the network of Figure 3 applied to a duplex telegraph system constructed in accordance with the disclosure of Milnor and Cannon, Patent No. 1,815,629 issued July 31, 1931, and entitled Artificial line networks; and Figure 5 shows schematically the manner of arranging and connecting a number of the inductance coils employed in the artificial lines so as to neutralize the effects of stray magnetic fields.

In said patent of Milnor and Cannon an artificial line has been shown for balancing a composite submarine cable, that is, a cable in which the main portion is loaded and the shore ends are left unloaded, whereby the loaded portion, which is the most difficult to balance, is removed to a considerable distance from the terminal apparatus. In accordance with the principles set forth in said patent the conductor and sea return impedance of the system are balanced over the range of frequencies required for high speed telegraph operation by a network, composed of series inductance and resistance with shunt paths conductively connected around certain of the series elements, and with shunt condensers some of which are shunted with additional frequency variable networks. This arrangement is demonstrated mathematically to closely correspond to the impedance characteristics of the cable.

The present invention is shown as particularly applied to a cable system of the type disclosed in said prior patent, the balancing network being modified and inductively arranged to balance the mutual inductance existing between the main and sea-earth cables. It is to be understood, however, that the invention is not limited to such type of cable system, nor to the type of artificial line shown in said prior patent, this type being adopted by way of illustration only and is not to be considered in a limiting sense.

Figure 1:
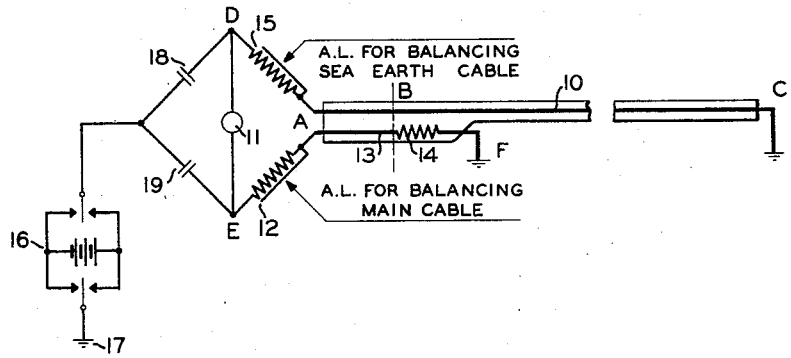
Figure 1 is a schematic view showing the manner in which the main and sea-earth artificial lines, associated with the sea-earth and main cables, are arranged to form the duplex bridge.

Referring now to Figure 1 I have shown one terminal of a long submarine cable 10 which may be completely loaded or which may have the head or shore end unloaded. The main cable 10 forms part of one of the arms of a duplex bridge, having the receiving instrument 11 connected there across. The main artificial line 12 is connected in the opposite impedance arm of the bridge and is in series with a long sea-earth cable 13, which may extend out to sea from point A to point B, a distance which may be as much as one hundred miles or more, parallel to and preferably in the same sheath as the main cable 10. The sea-earth cable 13 terminates in an impedance 14, which has substantially the same impedance characteristics as the main cable from the point B to the end C of the cable.

Since the receiving instrument is connected directly across the bridge arms between the points D and E, the cable system must be conjugate at these points. This requires that the two arms of the bridge D—C and E—F have the same impedance characteristics.

Normally, if the sea-earth were short, the upper impedance arm, including the cable A—C, would be exactly balanced by the artificial line 12. However, since it has been necessary to add to the artificial line a substantial section of sea-earth conductor 13, it is of advantage to introduce a second artificial line 15, equivalent to the sea-earth conductor 13, in series with the main cable itself, thus making the two arms of the bridge D—C and E—F collectively equivalent series circuits, although the elements thereof are not disposed in the same order. Hence, the interference picked up by the section A—B will be the same amount in each cable and in the opposite relation with respect to the receiving apparatus 11, so that the latter will be affected to a relatively small degree by the extraneous currents received from the cable.

The transmitting apparatus is represented diagrammatically by a pole changing transmitter 16 connected to the ground 17 and to the junction of the bridge arms 18 and 19 in the usual manner.

As stated above, the presence of the long sea-earth conductor 13 within the same sheath as the cable conductor 10 will result in mutual coupling between the two conductors, and since the sea-earth conductor may be of considerable length, one hundred miles or more, the mutual impedance of the conductors will be quite appreciable. It becomes of advantage, therefore, to provide a like coupling between the cable artificial line and the sea-earth artificial line in order to secure a satisfactorily exact balance.

In order to demonstrate the similarity in the electrical characteristics of my improved artificial line network with those of the mutually coupled cable and sea-earth conductor and to establish certain equations for determining the constants for the preferred type of artificial line, a form of equation representing the voltage drop along each of the mutually coupled conductors will first be developed, and then for purposes of comparison, I will develop an equation representative of similar conditions in the preferred form of artificial line network.

Figure 2:
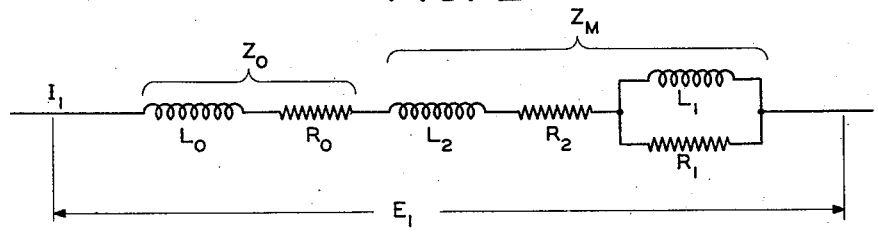
Figure 2 illustrates an equivalent circuit for each conductor of a twin core cable.

The equivalent circuit for each conductor of a twin core cable is shown in Figure 2. In this diagram, the quantity $R_o$ represents copper resistance, and $L_o$ represents inductance due to the flux which links one conductor only. The quantities $R_1$, $R_2$, $L_1$, and $L_2$ represent resistance and inductance components of the mutual impedance which is common to both conductors. If a current $I_1$ is flowing in the first conductor and a current $I_2$ flows in the adjacent conductor, the voltage drop along the first conductor will be:

$$E_1 = Z_o I_1 + Z_m I_1 + Z_m I_2 \quad (1)$$

substituting for $Z_o$ and $Z_m$ their values in terms of resistance and inductance, this equation becomes:

$$E_1 = \left(R_o + j\omega L_o + R_2 + j\omega L_2 + \frac{R_1 j\omega L_1}{R_1 + j\omega L_1}\right) I_1 + \left(R_2 + j\omega L_2 + \frac{R_1 j\omega L_1}{R_1 + j\omega L_1}\right) I_2 \quad (2)$$

where $$\omega = 2\pi f$$

and $$j = \sqrt{-1}$$

Let $$R_o + R_2 = R,$$

then:

$$E_1 = \left(j\omega(L_o + L_2) + \frac{R_1 R + j\omega L_1 R + j\omega L_1 R_1}{R_1 + j\omega L_1}\right) I_1 + \left(R_2 + j\omega L_2 + \frac{j\omega L_1 R_1}{R_1 + j\omega L_1}\right) I_2 \quad (3)$$

A preferred type of artificial line network for simulating a two conductor ocean cable is represented by Fig. 3 in which the two conductors are represented by H—H and I—I. Each line comprises the series inductances $L_3$, $L_3'$, and series resistance $R_3$, the latter having the inductance $L_4'$ and resistance $R_4$ serially arranged in shunt thereto, inductance elements $L_3'$ and $L_4'$ of one line being inductively coupled with the corresponding elements of the other line. It will now be shown mathematically by developing an equation for the network of Figure 3, in the general form of Equation (3) above, that the artificial line of Figure 3 can be made to closely resemble a pair of conductors each of which is represented in its equivalent circuit form in Figure 2.

Using the symbols for resistance R, inductance L, voltage E and current I as shown in Figure 3, the following equations can be set up from Kirchoff's Laws.

$$E_1 = j\omega(L_3 + L'_3) I_1 + j\omega L_3' I_2 + I_3 R_3 \quad (4)$$

$$E_2 = j\omega(L_3 + L'_3) I_2 + j\omega L_3' I_1 + I_4 R_3 \quad (5)$$

$$I_3 R_3 = (I_1 - I_3)[R_4 + j\omega(L_4' + L_4)] + (I_2 - I_4) j\omega L_4' \quad (6)$$

$$I_4 R_3 = (I_2 - I_4)[R_4 + j\omega(L_4' + L_4)] + (I_1 - I_3) j\omega L_4' \quad (7)$$

Solving these equations for $E_1$ in terms of $I_1$ and $I_2$:

$$E_1 = \left(j\omega(L_3 + L_3') + \frac{(R_3 + R_4) R_4 + 2j\omega L_4' R_4 + j\omega L_4' R_3}{\frac{(R_3 + R_4)^2}{R_3} + 2j\omega L_4' \frac{R_3 + R_4}{R_3}}\right) I_1 + \left(j\omega L_3' + \frac{j\omega L_4' R_3}{\frac{(R_3 + R_4)^2}{R_3} + 2j\omega L_4' \frac{R_3 + R_4}{R_3}}\right) I_2 \quad (8)$$

If the numerator and denominator of the fractions of this equation are multiplied by $$\tfrac{1}{2}\left(\frac{R_3}{R_3+R_4}\right)^3$$

then:

$$E_1 = \left(j\omega(L_3+L_3') + \frac{\frac{R_3^3 R_4}{2(R_3+R_4)^2} + j\omega\frac{R_3^3 L_4' R_4}{(R_3+R_4)^3} + j\omega\frac{R_3^4 L_4'}{2(R_3+R_4)^3}}{\frac{R_3^2}{2(R_3+R_4)} + j\omega\frac{R_3^2 L_4'}{(R_3+R_4)^2}}\right) I_1 +$$

$$\left(j\omega L_3' + \frac{j\omega\frac{R_3^4 L_4'}{2(R_3+R_4)^3}}{\frac{R_3^2}{2(R_3+R_4)} + j\omega\frac{R_3^2 L_4'}{(R_3+R_4)^2}}\right) I_2 \quad (9)$$

Equations (3) and (9) will be equivalent, except for the $R_2$ term in last member of (3) when $$\frac{R_3^2}{2(R_3+R_4)} = R_1; \frac{(R_3^2 L_4')}{(R_3+R_4)^2} = L_1; \frac{R_3^3 R_4}{2(R_3+R_4)^2} = R_1 R;$$

$$\frac{R_3^3 R_4 L_4'}{(R_3+R_4)^3} = L_1 R; \quad \frac{R_3^4 L_4'}{2(R_3+R_4)^3} = L_1 R_1; \quad \begin{array}{l} L_3' = L_2; \\ L_3 = L_0; \end{array}$$

Since $R_2$ represents only the resistance component of the mutual impedance, its value in general will be small and in a practical artificial line can generally be neglected.

Solving for the components of the artificial line in terms of the measured values of the real line.

$$L_4' = \frac{L_1}{R_1^2}\left(R_1 + \frac{R}{2}\right)^2; \quad (10)$$

$$R_3 = 2R_1\left(1 + \frac{R}{2R_1}\right); \quad (11)$$

$$R_4 = \frac{R}{R_1}\left(R_1 + \frac{R}{2}\right); \quad (12)$$

$$L_3' = L_2; \quad (13)$$

$$L_3 = L_0; \quad (14)$$

Therefore, if an artificial line be constructed according to Figure 3, with values of $L_4'$, $R_3$, $R_4$, $L_3'$, and $L'$ calculated according to Equations (10) to (14) from the measured components outlined in Figure 2 for an actual cable, a substantially perfect resemblance will result.

A sea earth artificial line of the type just developed, when embodied in a cable system of the type disclosed in the above mentioned patent of Milnor and Cannon, is shown in Figure 4, in which the inductance and resistance elements bear the same symbols as in Figure 3. This illustration shows the duplex bridge of Figure 1 with its terminal D connected to the cable conductor 10 through the sea-earth artificial line 15, and terminal E connected through the main artificial line 12 to the long sea-earth conductor 13. The earth connection 17 for the transmitter 16 is shown carried a short distance to sea through cable conductor 20.

The artificial line 15 for balancing the sea-earth cable 13 is relatively short, only two sections of the form of network of Figure 3 being shown. Artificial line 12 for balancing the main cable, contains a relatively large number of sections and is divided into two parts 21 and 22, the former being disposed at the head end and being symmetrically coupled to the sections of the artificial line 15 and being equal in number and form thereto. The portion 22 is further out from the head end and serves to balance the portion of the cable between points B and C, (Fig. 1). It omits the inductances $L'_3$, and is constructed in accordance with the principles set forth in the aforesaid patent of Milnor and Cannon. Capacities $C_1$ are provided in each artificial line to balance the distributed capacity to ground of the respective conductors. The quantities $L'_3$, $L'_4$, $R_3$ and $R_4$ cannot be identified as balancing particular properties of the two cables, but must be defined in the terms of the Equations (10) to (13). In combination they serve to compensate for the cable properties initially defined in Figure 2.

In case it is found that an exact balance for the duplex bridge cannot be obtained on account of materially different impedances to ground of the two artificial lines, these capacities may be equalized by the addition of a network 23 comprising resistance and capacity which connects to ground the side of the artificial line having the highest impedance. Although a definite connecting point for the network 23 is shown in Figure 4, other points may be found preferable in particular instances.

In order to further reduce interference, as from stray magnetic fields, which might generate currents within the artificial lines that would interfere with the reception of signals, I assemble the inductance coils $L_3$ in the manner shown in Figure 5 so as to neutralize the effects of such fields. The coils are arranged in groups of four within a common shielding container 24, the direction of the winding of the respective coils being such that a stray field passing downward, for instance, will produce currents in each coil in the direction shown by the arrows. The coils 25, 26, 27 and 28 of each group are connected in pairs designated type 1 and type 2, so that the induced currents in the coils of each pair will be in opposing directions and will tend to neutralize each other. Furthermore, the direction of coil winding of the adjacent groups of two, that is, type 1 and type 2, are connected in opposition, so that any residual or unneutralized disturbing current that may remain and which is likely to be in the same direction, will be further suppressed. The same principle is followed in assembling and connecting the adjacent odd and even groups of four.

It has been found that this method of assembling and connecting the large number of inductance coils which make up an artificial line for a long loaded cable, limits to a negligible amount the induced currents from local alternating current power systems, adjacent signalling systems, and from natural causes.

While the inductively coupled networks have been described with particular reference to balancing the main and sea-earth cables of a telegraph system employing a long sea-earth, it is to be understood that it is not limited thereto, but is equally applicable to balancing inductively disposed parallel conductors employed in other applications. Obviously, various modifications and changes in the exact arrangement will occur and, therefore, I do not desire to be limited except as required by the appended claims.

What I claim is:

1. A submarine cable telegraph system comprising a duplex bridge having equal impedance arms, a main artificial line and a sea-earth cable in one of said arms and a main cable and an artificial line for balancing said sea-earth cable disposed in the other impedance arm, said main and sea-earth cables being arranged in inductive relationship and said main and sea-earth artificial lines being similarly inductively related.

2. A submarine cable telegraph system comprising a main cable and a sea-earth cable inductively associated therewith, a main artificial line comprising a part for balancing a portion of the main cable associated with said sea-earth cable and a part for balancing the remainder of said main cable and a sea-earth artificial line for balancing said sea-earth cable, said sea-earth artificial line and the first part of the main artificial line being electrically equivalent and inductively related.

3. A submarine cable telegraph system comprising a main cable and a sea-earth cable inductively associated therewith, a main artificial line for simulating the characteristics of said main cable and a sea-earth artificial line for simulating the characteristics of said sea-earth cable, said artificial lines comprising a plurality of sections each section including series impedance having resistance and inductive reactance and shunt capacity and an inductive reactance conductively connected in shunt to said resistance, the inductive reactances of said two artificial lines being mutually coupled together whereby the self and mutual impedance of said main and sea-earth cables is closely simulated.

4. A submarine cable telegraph system comprising a main cable and a sea-earth cable inductively associated therewith, a main artificial line for simulating the characteristics of said main cable and a sea-earth artificial line for simulating the characteristics of said sea-earth cable, said artificial lines comprising a plurality of sections, each section of the sea-earth artificial line and an equal number of sections of the main artificial line including a network having series impedance elements some of which are shunted by inductance elements, at least a portion of the inductance of one of said artificial lines being inductively related to the corresponding inductances of the other artificial line.

5. A submarine cable telegraph system comprising a duplex bridge having equal impedance arms, a main artificial line and a sea-earth cable in one of said arms and a main cable and an artificial line for balancing said sea-earth cable disposed in the other impedance arm, said artificial lines including a number of sections, each section having series resistance and inductance and resistance and inductance in parallel, the inductance elements of one artificial line being in part coupled to the inductance elements of the other artificial line.

6. A submarine cable telegraph system comprising a main cable and a sea-earth cable of substantial length disposed within the same sheath, an artificial line for balancing said main cable located in series with the sea-earth cable and an artificial line for balancing said sea-earth cable located in series with the main cable each of said artificial lines comprising a number of sections of network including resistance and inductance so arranged and inductively related that the voltage drop in each of said sections over a range of frequency is substantially equal to the voltage drop through a definite length of one of said cable conductors.

7. A submarine cable telegraph system comprising a main cable and a sea-earth cable of substantial length inductively related, an artificial line for balancing said main cable located in series with the sea-earth cable and an artificial line for balancing said sea-earth cable located in series with the main cable each of said artificial lines comprising a number of sections of network including resistance and inductive reactance of a value determined from the measured constants of said cables, arranged and inductively related to balance the impedance of said respective cables at all frequencies over a substantial portion of the signaling range.

8. In a twin core cable, an artificial line for balancing each conductor of said cable located in series with the conductor other than the one which it balances, said artificial lines being composed of a number of sections each comprising series resistance and series inductance reactance with additional inductive reactance in shunt to some of said series elements, the value of said resistance and inductive reactance being determined from the constants of said cable and the sections of one artificial line being inductively related to the sections of the other artificial line so that the self impedance and mutual impedance of each of said cores are balanced over a substantial range of frequencies.

9. A submarine cable telegraph system comprising a main cable and a sea-earth cable inductively associated therewith, an artificial line for each of said cables, each of said lines having elements inductively related to each other to simulate the mutual and self impedance of each of said cables and means equalizing the capacity to ground of said artificial lines.

10. An electrical net work comprising two inductively coupled artificial lines comprising resistance, inductive reactance and capacity reactance for simulating the impedance of two inductively associated conductors and means for equalizing the capacity to ground of said artificial lines comprising a shunt path to ground for said artificial line having the highest impedance to ground, said path including a network comprising series resistance and shunt capacities.

11. In an artificial line including inductances, a method of neutralizing the effects of extraneous magnetic fields comprising serially connecting the inductances in sets of two and groups of four, the individual coils of each in sets of two and groups of four, the individual coils of each set being oppositely disposed and the adjacent sets of each group being oppositely disposed whereby an enveloping magnetic field will induce currents in opposite directions in each coil of each set and in each set of each group.

12. In an artificial line including inductances, a method of neutralizing the effects of extraneous magnetic fields comprising serially connecting the inductances in sets of two and groups of four, the individual coils of each set being oppositely disposed and the adjacent sets of each group being oppositely disposed, each group having a second group oppositely disposed with respect thereto whereby a magnetic field of definite direction will induce currents in opposite direction in each coil of each set, in each set of each group, and in each of two associated groups.

13. In a duplex submarine cable equipped with a long sea-earth conductor mutually coupled with the main cable, artificial lines for balancing the resistance, inductance, and sea return impedance of each cable together with their variations with frequency, the elements of said lines being mutually coupled so as to balance the mutual inductance between the cable and sea-earth conductors.

14. In duplex telegraphy, a twin core cable each core having inductance and resistance due to their respective sea return paths, the two cores also possessing mutual inductance, and means including inductance elements mutually coupled for simulating the sea return inductance and resistance and the mutual inductance of the two cables respectively.

15. In combination, a duplex submarine cable conductor and a long sea-earth conductor therefor, both conductors possessing resistance and inductance which are variable with frequency, also possessing mutual inductance between them, and means including mutually coupled inductances for balancing each of these characteristics of the two conductors.

16. A two conductor artificial line for balancing a duplex submarine cable equipped with a long sea-earth and located in the same sheath, consisting of sections having inductance and resistance in series, some of the inductance being shunted by resistance, and some of the inductance of both artificial lines being mutually coupled together.

In testimony whereof, I affix my signature.

JOSEPH W. MILNOR.